United States Patent [19]
Ozeki

[11] Patent Number: 5,259,048
[45] Date of Patent: Nov. 2, 1993

[54] OPTICAL EQUALIZER

[75] Inventor: Takeshi Ozeki, Kawaguchi, Japan

[73] Assignee: Kabushiki Kaisha Toshiba, Kawasaki, Japan

[21] Appl. No.: 944,175

[22] Filed: Sep. 11, 1992

[30] Foreign Application Priority Data

Sep. 30, 1991 [JP] Japan .................................. 3-278547
Nov. 30, 1991 [JP] Japan .................................. 3-339595

[51] Int. Cl.$^5$ .......................... G02B 6/00; G02B 6/36
[52] U.S. Cl. ...................................................... 385/31
[58] Field of Search ................... 385/31, 32, 39, 27, 385/33, 38, 53, 11, 147

[56] References Cited

U.S. PATENT DOCUMENTS

| | | | |
|---|---|---|---|
| 5,127,066 | 6/1992 | Poggiolini | 385/31 X |
| 5,185,826 | 2/1993 | Delavaux | 385/31 X |
| 5,191,631 | 3/1993 | Rosenberg | 385/31 X |

OTHER PUBLICATIONS

IEEE Photonics Technology Letters, vol. 2, No. 3, Mar. 1990, L. J. Cimini, et al., pp. 200-202, "Optical Equalization for High-Bit Rate Fiber-Optic Communications."

Optics Letters, vol. 16, No. 5, Mar. 1, 1991, F. Quellette, pp. 303-304, "All-Fiber Filter for Efficient Dispersion Compensation."

Post deadline papers, OFC '92, J. M. Dugan, et al., pp. 367-370, "All-Optical, Fiber-Based 1550 Dispersion Compensation in a 10 Gbit/S, 150 Km Transmission Experiment Over 1310 nm Optimized Fiber."

*Primary Examiner*—Akm E. Ullah
*Attorney, Agent, or Firm*—Oblon, Spivak, McClelland, Maier & Neustadt

[57] ABSTRACT

When a light wave passes through an optical fiber used as an optical communication line, different time delays are introduced in its frequency components according to the delay characteristic of the optical fiber, limiting the usable bandwidth. An optical equalizer according to the present invention comprises a multi-stage connection of one or more unit optical circuit elements for introducing time delays opposite to the delay characteristic of the optical fiber in frequency components in the neighborhood of the transmission band used. The optical equalizer is placed at the input end of a transmission line and equalizes time delays of the frequency components passing through the transmission line, thereby expanding the usable bandwidth.

13 Claims, 7 Drawing Sheets

OPTICAL EQUALIZER

BACKGROUND OF THE INVENTION

1. Field of the Invention

The present invention relates to an optical equalizer available for a very-high-speed long-distance transmission line in optical communications.

2. Description of the Related Art

As is well known, optical communications need technical advances so as to fulfill a major role in communication infrastructures in intellectual information (informationized) society. For this reason, the optical communications technology has made rapid advance, and its transmission rate and degree of multiplexing are improving with every passing year. Thus, trunk communication lines built by the use of high technology will soon become insufficient in capacity, requiring improvements by the state-of-the-art technology.

For improvements of the trunk communication lines, alterations only to terminal stations would be economically advantageous. However, rebuilding of optical fiber lines used as trunk lines because of their oldfashioned responses is very costly, which is almost impossible. It is therefore desired to develop methods which can realize much higher speed transmission with existing lines.

As a concrete example, consider now that such improvements as to enable much higher speed transmission are made in long-distance trunk lines, which are employed at a transmission rate in the order of giga bits per second (Gbps), using optical fibers having wavelength characteristics in which the delay time dispersion is minimum in the 1.3-$\mu$m band. (Hereinafter, such optical fibers are referred to as normal dispersive fibers.) In this case, in order to keep light transmission loss small and secure light received power required, the wavelength of light used may be changed to 1.55 $\mu$m. In addition, intermediate light repeaters for light amplification may be provided.

However, the normal dispersive fibers have a delay-time dispersion as large as 17 ps/nm in the 1.55-$\mu$m band, which will cause a deficiency of bandwidth. Thus, the use of direct modulation of semiconductor lasers that is currently considered effective would make difficult very high-speed long-distance transmission at a required rate of several gigabits per second. In this case, the use of external light modulators might be considered to reduce a modulation bandwidth required and alleviate the influence of the delay time dispersion. However, this method will not only increase cost but also confront a band limitation problem, failing to meet the requirements of the very-high-speed long-distance transmission.

On the other hand, dispersion-shifted optical fibers in which the delay time dispersion is minimum in the 1.55 $\mu$m band can be used as trunk lines. These optical fibers, used as trunk lines, are connected by light amplifiers, forming a transmission line. Through this transmission line, light signals can be transmitted without being converted into electric signals and can, hence, be transmitted at a very high speed and over a very long distance (for example, over the Pacific). Since the band used in this high-speed, long-distance transmission line is in the neighborhood of the zero point of the parabolic delay-time dispersion characteristic of the fibers, a bandwidth deficiency problem arises. Solution of this problem would need complicated control, resulting in an increase in transmission cost.

SUMMARY OF THE INVENTION

Heretofore, as described above, when existing optical communication lines are used in increasing the transmission rate of optical communications, the delay time dispersion characteristic of normal dispersive optical fibers or dispersion-shifted optical fibers used as the communication lines becomes a problem. No effective means have been found which can solve this problem while checking an increase in transmission cost to a minimum.

It is therefore an object of the present invention to provide an optical equalizer which, just placed in an existing optical communication line, permits very high speed transmission to be realized easily and an increase in transmission cost to be checked to a minimum.

According to the present invention there is provided an optical equalizer for use with an optical fiber serving as an optical communication line comprising: a light separating section for extracting a poralized component in one direction from an incident light wave and separating the polarized component into a pair of complex light waves; an optical circuit section, including a plurality of birefringent sections that are connected in series with an angle made between their principal axis in a place where they are connected and a phase plate installed in a place where they are connected, for providing a different amount of delay for each of the complex light waves in transmitting the pair of complex light waves output from the light separating section to thereby equalize dispersion in delay time; and a light combining section for combining the pair of complex light waves whose dispersion in delay time has been equalized by the optical circuit section, the combined complex light waves being delivered to an optical fiber.

According to the present invention there is provided an optical equalizer for use with an optical fiber serving as an optical communication line comprising an input section having light distributing means for distributing an incoming light wave to first and second systems by light waveguides with no polarization dependence; an intermediate section for repeating a delay process of delaying a light wave distributed to the first system by the input section and optically coupling and distributing process of optically coupling the delayed light wave on the first system and a light wave on the second system and then distributing the optically coupled light wave to the first and second systems; and an output section having optically coupling means for optically coupling light waves finally distributed to the first and second systems in the intermediate for transmission to the optical fiber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodi

DETAILED DESCRIPTION OF THE PREFERRED EMBODIMENTS

Figure 1:
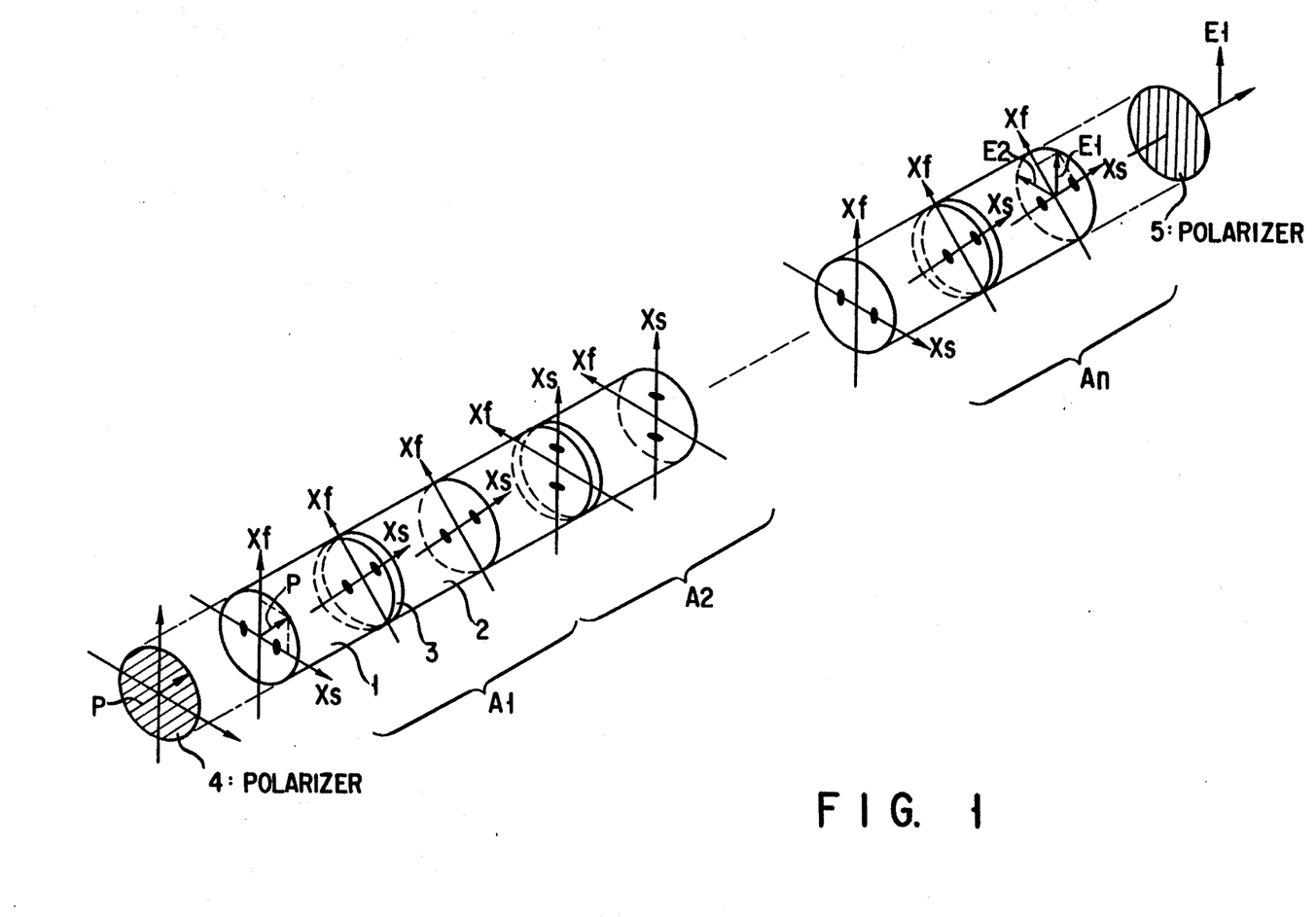
- FIG. 1 illustrates a first embodiment of an optical equalizer according to the present invention.

Referring now to FIG. 1, there is illustrated a first embodiment of an optical equalizer according to the present invention. Suppose here that, as an example, a normal dispersive fiber, which is used as an existing optical communication line and has a characteristic in which the delay time dispersion is minimum at a wavelength of 1.3 μm (f1 in frequency), is used to transmit light waves in the 1.55-μm band (centered at f2) with little loss.

In FIG. 1, A1 to An denote unit optical circuit elements having the same arrangement. A1 will be described on behalf of the unit optical circuit elements. The unit optical circuit element A1 is comprised of first and second birefringent sections 1 and 2 which have a length ratio of one to one and are connected in series. Polarization maintaining fiber are used for the materials 1 and 2. An angle of connection of the second material 1 to the first material 1 is +45 degrees. A phase plate 3 is interposed between the materials 1 and 2. For convenience of description it is supposed here that the phase plate 3 constitutes a part of the first birefringent section 1.

The unit optical circuit elements A1 to An are connected in series with their corresponding principal axis (polarization maintaining axis) Xf and Xs aligned with each other. That is, an angle of connection between adjacent elements is set as 0 degree. The number n of the elements is determined as needed.

A polarizer 4 is disposed at the end of the element A1 on which a light wave is incident. At this point, the polarizer 4 is adjusted so that its plane of polarization will make an angle of 45 degrees with the polarization maintaining axis Xf and Xs of the birefringent section 1. Thereby, a light wave P incident on the optical equalizer is separated by the polarizer 4 into two polarized light's components in the Xf and Xs directions, which are, in turn, directed onto the birefringent section 1 of the unit optical circuit element A1.

A polarizer 5 is also disposed at the end of the unit optical circuit element An from which outgoing light emerges. When disposed, the polarizer 5 is adjusted so that its plane of polarization will make an angle of 45 degrees with polarization maintaining axis Xf and Xs of the birefringent section 2. Thereby, the two polarized components in the Xf and Xs directions emerging from the birefringent section 2 ar combined by the polarizer 5. The light emerging from the polarizer 5 serves as outgoing light of the optical equalizer.

The optical equalizer thus configured has its input side directly connected to the optical output of an optical transmitter for transmitting light waves and its output side directly connected to the light wave receiving end of a normal dispersive fiber serving as an optical communication line. The polarizers 4 and 5 can be omitted where the optical transmitter and the communication line have polarizers attached to their respective ends.

Each of the two polarized components in the Xf and Xs directions in the birefringent sections 1 and 2 can be regarded as a complex wave. In the following description, the complex wave polarized in the Xf direction is referred to as a fast wave, while the complex wave polarized in the Xs direction is referred to as a slow wave. Further, let the fast wave and the slow wave be represented by Xf and Xs, respectively.

The operation of the optical equalizer configured as described above will be described hereinafter.

First, the transfer function of a unit optical circuit element Am (m is any number from 1 through n) can be represented by a transfer matrix {m} given by expression (1).

$$
\{m\} = \overbrace{\begin{bmatrix} e^{-j\Phi}, & 0 \\ 0, & e^{+j\Phi} \end{bmatrix}}^{(a)} \overbrace{\begin{bmatrix} \frac{1}{\sqrt{2}}, & \frac{1}{\sqrt{2}} \\ -\frac{1}{\sqrt{2}}, & \frac{1}{\sqrt{2}} \end{bmatrix}}^{(b)} \overbrace{\begin{bmatrix} e^{-j\phi}, & 0 \\ 0, & e^{j\phi} \end{bmatrix}}^{(c)} \tag{1}
$$

$$
= \frac{1}{\sqrt{2}} \begin{bmatrix} e^{-j(\Phi+\phi)}, & e^{-j(\Phi-\phi)} \\ -e^{j(\Phi-\phi)}, & e^{j(\Phi-\phi)} \end{bmatrix}
$$

In expression (1), (a) represents the transfer function of the section 1, (b) represents the transfer function resulting from the connection between the sections 1 and 2 (there is an angular difference of 45 degrees therebetween), and (c) represents the transfer function of the section 2.

In the unit optical circuit element Am, amplitude values (Es, Ef) of incoming complex light waves in the Xf and Xs directions to the birefringent section 1 and amplitude values (Es', Ef') of outgoing complex light waves in the Xf and Xs directions emerging from the birefringent section 2 are related by expression (2) using expression (1).

$$
\begin{bmatrix} E_s' \\ E_f' \end{bmatrix} = \{m\} \begin{bmatrix} E_s \\ E_f \end{bmatrix} \tag{2}
$$

In expression (1), $\phi$ and $\Phi$ are represented by expression (3).

$$\phi = 2\pi f T_1 - \frac{\pi}{4} \quad \Phi = 2\pi f T_2 + \frac{\pi}{4} \quad (3)$$

f indicates a light frequency measured with the center frequency f2 of light waves to be transmitted taken as a standard. T1 indicates half of a difference in propagation time between the fast wave Xf and the slow wave Xs in the birefringent section 1, while T2 indicates half of a difference in propagation time between the fast wave Xf and the slow wave Xs in the birefringent section 2. A phase shift amount introduced by the phase plate 3 is $\delta = \pi/2$.

Using the second-kind Chebyshev polynomial $U_n(\alpha)$, the overall transfer function of a number n of optical circuit elements A1 to An connected in series can be represented by expression (4).

$$\{M\} = \begin{bmatrix} M_{11}, M_{12} \\ M_{21}, M_{22} \end{bmatrix} \quad (4)$$

$$M_{11} = \frac{1}{\sqrt{2}} e^{-j(\Phi+\phi)} U_n(\alpha) - U_{n-1}(\alpha)$$

$$M_{12} = \frac{1}{\sqrt{2}} e^{-j(\Phi-\phi)} U_n(\alpha)$$

$$M_{21} = -\frac{1}{\sqrt{2}} e^{-j(\Phi-\phi)} U_n(\alpha)$$

$$M_{22} = \frac{1}{\sqrt{2}} e^{-j(\Phi-\phi)} U_n(\alpha) - U_{n-1}(\alpha)$$

In expression (4), $\alpha$ and $U_n(\alpha)$ are represented by expression (5).

$$\alpha = \frac{1}{\sqrt{2}} \cos(\Phi + \phi) \quad (5)$$

$$U_n(\alpha) = \frac{\sin(n \cdot \cos^{-1}(\alpha))}{\sqrt{1-\alpha^2}}$$

From the above and if each amplitude is normalized to unity, outgoing complex light waves (E1, E2) from the second birefringent section 2 in the last-stage unit optical circuit element An can be represented by expression (6).

$$\begin{bmatrix} E_1 \\ E_2 \end{bmatrix} = \frac{1}{\sqrt{2}} \begin{bmatrix} 1,1 \\ -1,1 \end{bmatrix} \begin{bmatrix} M_{11}, M_{12} \\ M_{21}, M_{22} \end{bmatrix} \begin{bmatrix} \frac{1}{\sqrt{2}} \\ \frac{1}{\sqrt{2}} \end{bmatrix} \quad (6)$$

The plane of polarization of the polarizer 5 disposed on the output side of the optical equalizer makes an angle of 45 degrees with the principal axis Xf and Xs of the second birefringent section 2 in the last-stage unit optical circuit element An. Thus, the complex light wave E2 is blocked by the polarizer 5, and only the complex light wave E1 passes through the polarizer 5. The complex light wave E1 can be represented by expression (7).

$$E_1 = \frac{1}{2}(M_{11} + M_{12} + M_{21} + M_{22}) \quad (7)$$

$$= \frac{1}{\sqrt{2}} \cos(\Phi + \phi) U_n - U_{n-1} + \frac{j}{\sqrt{2}} \sin(\phi - \Phi) U_n$$

Therefore, the amount Tg of the group delay dispersion of the optical equalizer configured as described above is given by expression (8).

$$Tg = -\frac{1}{2\pi} \frac{d}{df}[arg(E_1)] \quad (8)$$

Figure 2:
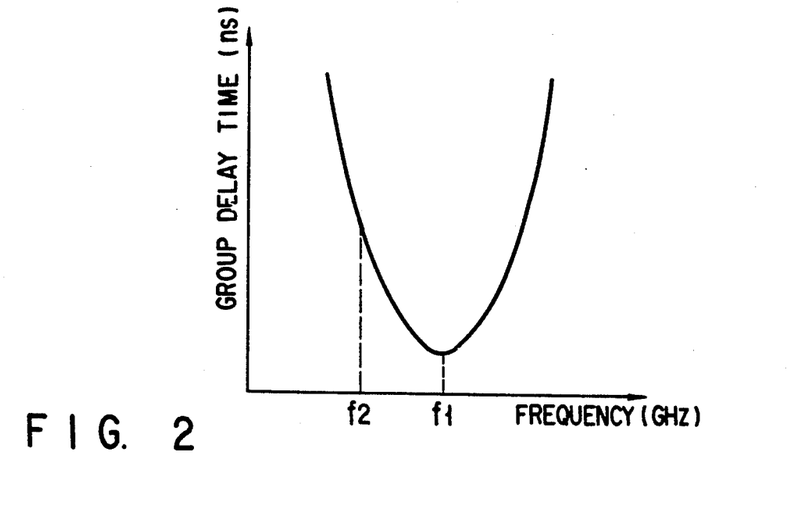
FIG. 2 illustrates group delay time versus frequency of a normal dispersive optical fiber used in the first embodiment.

More specifically, the group delay dispersion characteristic of the above-described normal dispersion fiber changes parabolically as shown in FIG. 2, becoming minimum at a wavelength of 1.3 μm (frequency f1). Thus, the dispersion characteristic of the fiber in the 1.55-μm band (centered at f2) changes in a linear fashion, and hence a slight change in wavelength, i.e., in frequency will bring about a considerable change in the amount of delay time dispersion, resulting in a deficiency of bandwidth.

As can be seen from FIG. 2, the higher the frequency is than f2, the smaller the transmission delay time becomes. Conversely, the lower the frequency is than f2, the greater the transmission delay time becomes. From this it will be understood that the transmission bandwidth can be expanded by providing great amounts of delay for high frequencies and small amounts of delay for low frequencies so that delay amounts are equalized.

In the first embodiment, therefore, after the separation of the incident light P into polarized components of the fast wave Xf and the slow wave Xs by the polarizer 4, the first birefringent section 1 in the unit optical circuit element A1 provides a small amount of delay for the fast wave component Xf and a large amount of delay for the slow wave component Xs and then the second birefringent section 2 excites both of the polarized components. The same processing is repeated for each of the unit optical circuit elements A2 to An and, finally, the polarized components are combined and output by the polarizer 5.

That is, in any unit optical circuit element Am, the fast wave Xf in the second birefringent section 2 is given by subtractive projection of the fast-wave and slow-wave components emerging from the first birefringent section 1. Its amplitude can be represented by $$j \sin(\phi + \pi/2) = -j\cos\phi$$

This means that low-frequency components are large in amplitude, and thus a function of providing optical-frequency-dependent delays is realized. In the second birefringent section 2, therefore, the fast-wave mode involves a large number of low-frequency components with small delay amounts, while the slow-wave mode involves a large number of high-frequency components with large delay amounts.

The repetition of such an action by the multi-stage configuration can be expressed by the above expression using the Chebyshev polynomial. As is evident from the expression, small amounts of delay are provided for low-frequency components, while large amounts of delay are provided for high-frequency components. This can compensate for the fiber's linear delay dispersion.

Figure 3A:
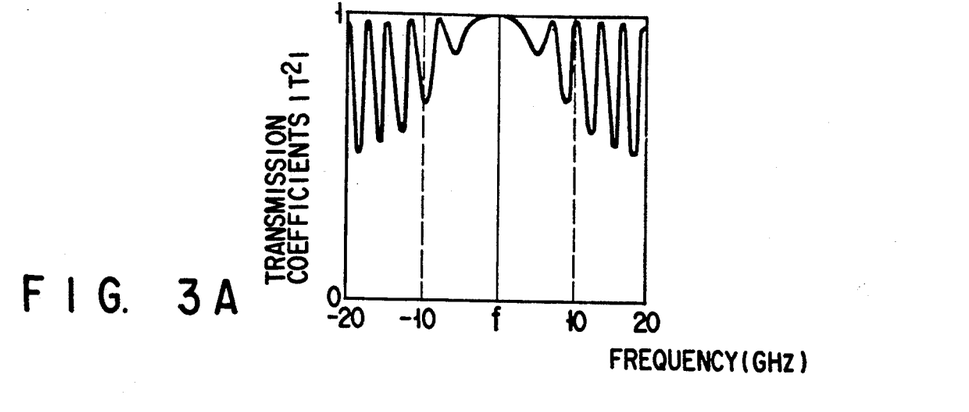
FIGS. 3A to 3C illustrate characteristics showing the expansion of transmission band achieved when the optical equalizer according to the first embodiment is used.
Figure 3B:
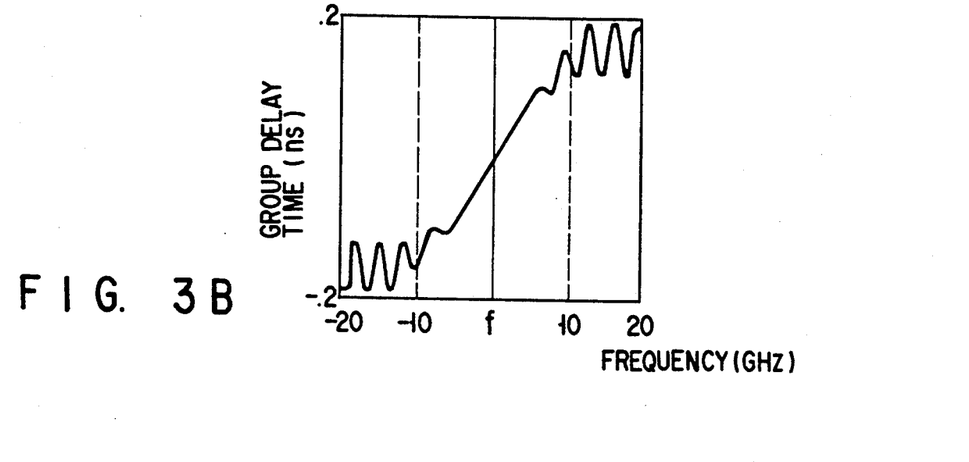
Figure 3C:
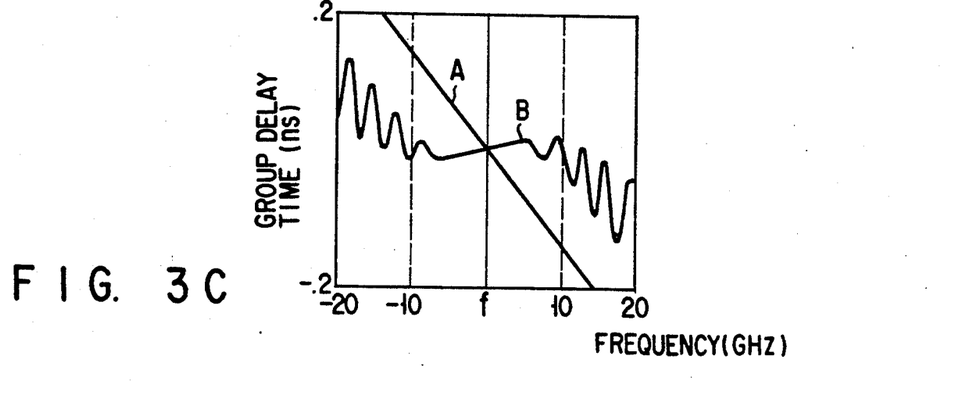

FIGS. 3A, 3B and 3C illustrate the compensation for the delay dispersion. This example supposes a case where an optical equalizer in which T1=T2=1/125 ns and n=12 is connected to a normal dispersive fiber in which the delay-time dispersion is minimum at 1.3 μm and which is 100 km in length. FIG. 3A shows the frequency-versus-transmission-coefficient characteristic of the normal dispersive fiber, FIG. 3B shows the frequency-versus-group-delay-time characteristic of the optical equalizer, and FIG. 3C shows the frequency-versus-group-delay-time characteristic of the normal dispersive fiber. In FIG. 3C, A represents the characteristic when the optical equalizer is not connected, while B represents the characteristic when the optical equalizer is connected.

As can be seen from FIG. 3C, when the optical equalizer is connected to the normal dispersive fiber used as an optical communication line, a transmission bandwidth of approximately ±10 GHz centered at f(=f2) in the 1.55-μm band can be obtained. In this case, the passband has a Chebyshev-like amplitude response, and a sufficient bandwidth can be secured for multi-stage connection, thus permitting compensation for linear delay dispersion.

Thus, since the use of the above-described optical equalizer widens the usable optical bandwidth of the optical communication line, much higher data transmission speeds can be achieved without the use of expensive external optical modulators or optical amplifiers. This can limit the transmission cost to a minimum.

In near future, dispersion-shifted optical fibers in which dispersion is minimum at a wavelength of 1.55 μm would be used as optical communication lines. In this case, in order to transmit light waves in the 1.55-μm band, it is required to compensate for the fiber's parabolic characteristic in the neighborhood of the point of zero dispersion so that the bandwidth deficiency problem can be solved.

Figure 4:
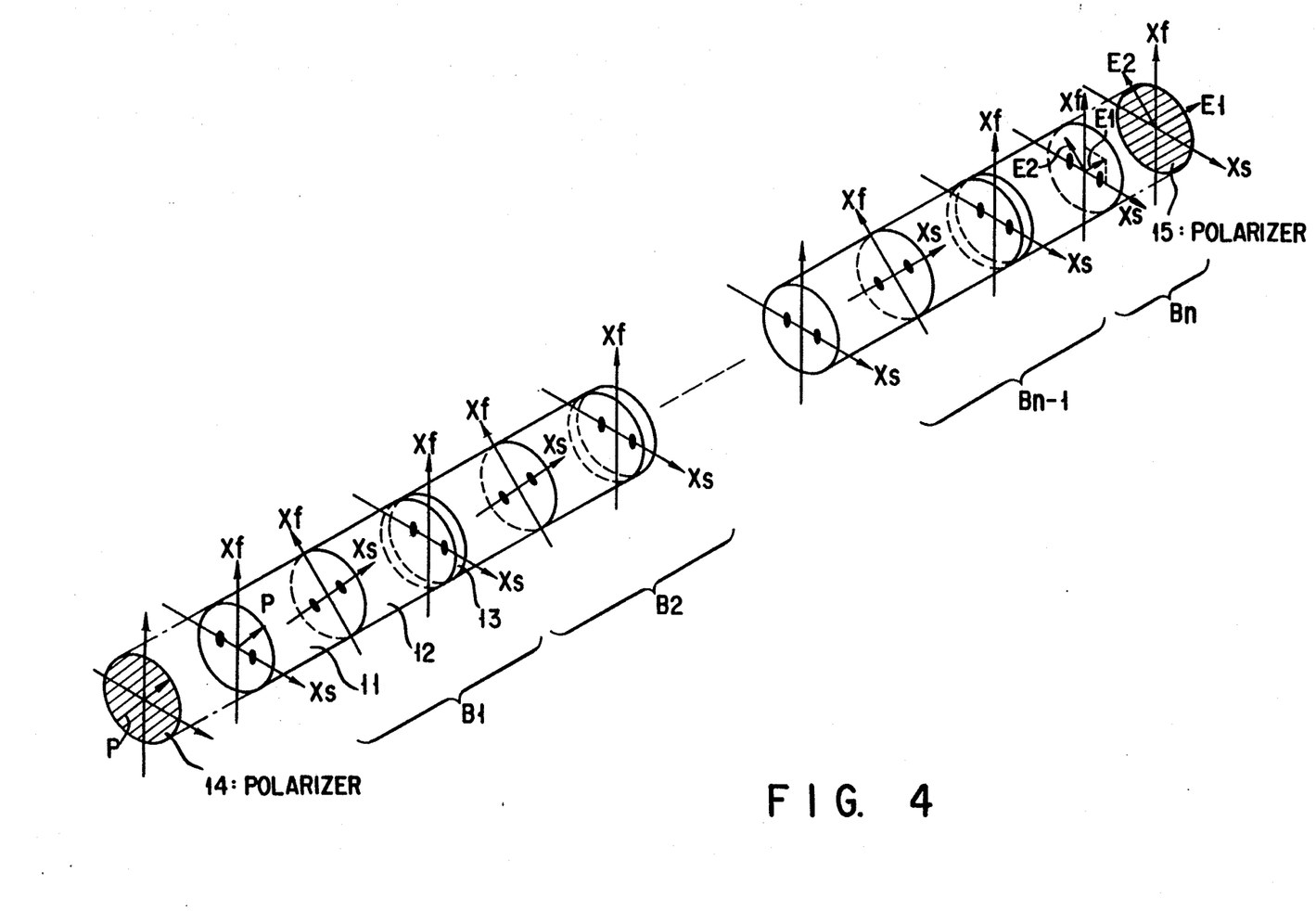
FIG. 4 illustrates a second embodiment of the optical equalizer of the present invention.

FIG. 4 illustrates an optical equalizer according to a second embodiment of the present invention, which realizes the above-described compensation. In FIG. 4, B1 to Bn-1 denote unit optical circuit elements having the same arrangement. B1 will be described on behalf of the unit optical circuit elements. The unit optical circuit element B1 is comprised of first and second birefringent sections 11 and 12 which have a length ratio of one to one and are connected in series with an angle of +45 degrees between their corresponding principal axis. Polarization maintaining fibers are used for the materials 11 and 12.

The unit optical circuit elements B1 to Bn-1 are connected in series with an angle of −45 degrees between corresponding principal axis (Xf, Xs) of the second and first materials of adjacent elements. The element Bn-1 is followed by a last-stage optical circuit element Bn, which is constructed of only a single birefringent section. The connection between the elements Bn-1 and Bn is made with an angle of −45 degrees between their corresponding principal axis.

A phase plate 13 is interposed between adjacent elements. Here, the phase plate 13 is supposed to be a part of the second birefringent section 12 for convenience of description. The number n of the elements is determined as needed.

A polarizer 14 is disposed at the end of the element B1 on which light is incident. In this case, the polarizer 14 is adjusted so that its plane of polarization will make an angle of 45 degrees with the polarization maintaining axis Xf and Xs of the birefringent section 1. Thereby, light wave P incident on the optical equalizer is separated by the polarizer 14 into two polarized light's components in the Xf and Xs directions, which are, in turn, directed to the birefringent section 1 of the unit optical circuit element B1.

A polarizer 15 is also disposed at the end of the unit optical circuit element Bn from which outgoing light emerges. In this case as well, the polarizer 15 is adjusted so that its plane of polarization will make an angle of 45 degrees with polarization maintaining axis Xf and Xs of the birefringent section 11. Thereby, the two polarized components in the Xf and Xs directions emerging from the birefringent section 11 are combined by the polarizer 15. The light emerging from the polarizer 15 serves as outgoing light of the optical equalizer.

The optical equalizer thus configured has its input side directly connected to the light wave outputting end of an optical transmitter for transmitting light waves and its output side directly connected to the light wave receiving end of a dispersion-shifted fiber serving as an optical communication line. The polarizers 4 and 5 can be omitted where the optical transmitter and the communication line have polarizers attached to their respective ends.

In the birefringent sections 11 and 12, as in the first embodiment, the two polarized components in the Xf and Xs directions can be regarded as complex light waves. In the following description, therefore, the complex light waves in the Xf and Xs directions are referred to as fast and slow waves, respectively. The fast wave and the slow wave are represented by Xf and Xs, respectively.

The action of the optical equalizer according to the second embodiment will be described hereinafter.

First, the transfer function of a unit optical circuit element Am (m is any number from 1 through n) can be represented by a transfer matrix {m} given by expression (9).

$$\{m\} = \overbrace{\begin{bmatrix} \frac{1}{\sqrt{2}}, & -\frac{1}{\sqrt{2}} \\ \frac{1}{\sqrt{2}}, & \frac{1}{\sqrt{2}} \end{bmatrix}}^{(d)} \overbrace{\begin{bmatrix} e^{-j\phi}, & 0 \\ 0, & e^{j\phi} \end{bmatrix}}^{(e)} \overbrace{\begin{bmatrix} \frac{1}{\sqrt{2}}, & \frac{1}{\sqrt{2}} \\ -\frac{1}{\sqrt{2}}, & \frac{1}{\sqrt{2}} \end{bmatrix}}^{(f)} \overbrace{\begin{bmatrix} e^{-j\phi}, & 0 \\ 0, & e^{j\phi} \end{bmatrix}}^{(g)} \qquad (9)$$

In expression (9), (d) represents the transfer function indicating the connection with the preceding element Bm-1 (there is an angular difference of +45 degrees), (e) represents the transfer function of the material 11, (f) represents the transfer function indicating the connection between the materials 11 and 12 (there is an angular difference of −45 degrees therebetween), and (g) represents the transfer function of the material 12.

According to the same calculations as the first embodiment, complex light waves (E1, E2) emerging from the last-stage unit optical circuit element Bn are given by expression (10).

$$\begin{bmatrix} E_1 \\ E_2 \end{bmatrix} = \frac{1}{\sqrt{2}} \begin{bmatrix} 1,1 \\ -1,1 \end{bmatrix} \begin{bmatrix} e^{-j\phi}, & 0 \\ 0, & e^{j\phi} \end{bmatrix} \begin{bmatrix} M_{11}, M_{12} \\ M_{21}, M_{22} \end{bmatrix} \begin{bmatrix} \frac{1}{\sqrt{2}} \\ \frac{1}{\sqrt{2}} \end{bmatrix} \quad (10)$$

The complex light wave E1 extracted by the polarizer 15 is given by expression (11).

$$E_1 = \cos\phi \cdot U_{n+1}(\alpha) - \exp(j\Phi)U_n(\alpha) \quad (11)$$

Its group delay time Tg is given by expression (12).

$$Tg = -\frac{1}{2\pi} \frac{d}{df} [areg(E_1)] \quad (12)$$

$\phi$, $\Phi$, $\alpha$ in the above expressions are given by expression (13).

$$\phi = 2\pi fT_1$$

$$\Phi = 2\pi fT_2 + \frac{\pi}{2} \quad (13)$$

$$\alpha = \cos\phi \cos\Phi$$

Figure 5A:
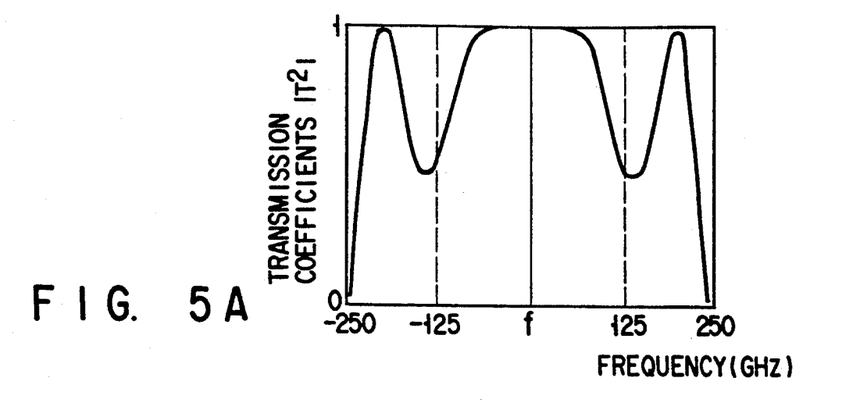
FIGS. 5A to 5C illustrate characteristics showing the expansion of transmission band achieved when the optical equalizer according to the second embodiment is used.
Figure 5B:
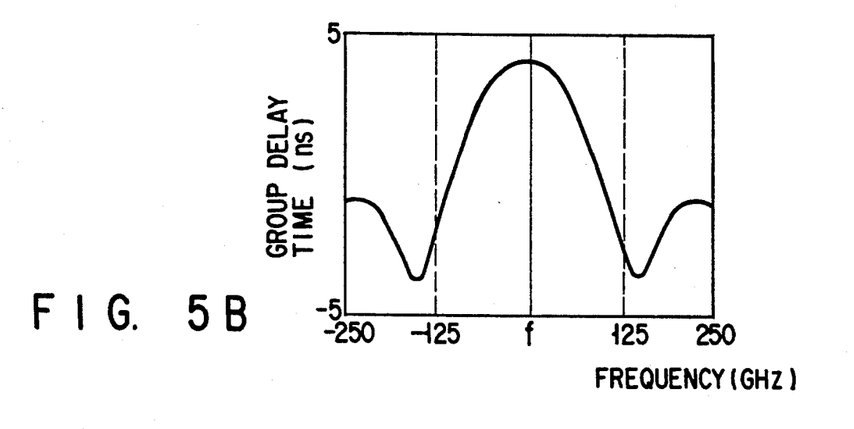
Figure 5C:
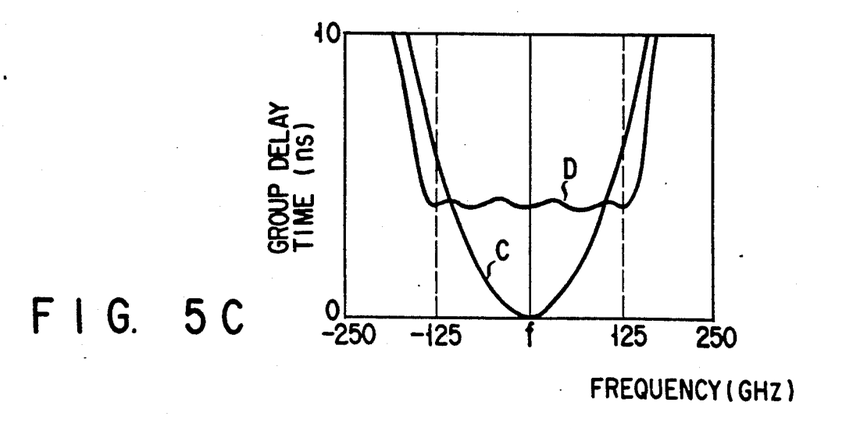

FIGS. 5A, 5B and 5C illustrate exemplary characteristics exhibited by the above expressions. This example supposes a case where an optical equalizer in which T1=T2=10 ps and n=8 is connected to a dispersion-shifted optical fiber in which the delay time dispersion is minimum at 1.55 μm and which is 100 km in length. FIG. 5A shows the frequency-versus-transmission-coefficient characteristic of the dispersion-shifted fiber, FIG. 5B shows the frequency-versus-group-delay-time characteristic of the optical equalizer, and FIG. 5C shows the frequency-versus-group-delay-time characteristic of the dispersion-shifted optical fiber. In FIG. 5C, C represents the characteristic when the optical equalizer is not connected, while D represents the characteristic when the optical equalizer is connected.

As can be seen from FIGS. 5A, 5B, and 5C, a transmission bandwidth of approximately ±125 GHz centered at f (1.55 μm) band is obtained. This is due to the connection of the optical equalizer that has the characteristic opposite to the fiber's parabolic characteristic in the neighborhood of zero dispersion point of the dispersion-shifted optical fiber. Thus, the optical equalizer configured as described above can compensate for the parabolic characteristic in the neighborhood of the zero dispersion point of the dispersion-shifted optical fiber.

Thus, the use of the above-described optical equalizer permits a bandwidth deficiency problem to be solved without requiring complicated control. For this reason, even in a case where the optical equalizer is used with such a very-high-speed long-distance transmission line as extends over the Pacific Ocean, in which case information is relayed by optical amplifiers without being converted to electric signals, the bandwidth deficiency problem can be solved without requiring complicated control. This can limit the transmission cost to a minimum.

Although, in the first and second embodiments, constant polarization fibers are used for the first and second birefringent sections 1 and 2; 11 and 12, birefringent crystals are also available.

In FIG. 1, the birefringent sections are shown connected between unit optical circuit elements. In practice, the second birefringent section 2 in the preceding stage and the first birefringent section in the succeeding stage 1 are formed integral with each other. The phase plates 3, 13 need not be inserted as parts. They may be formed by processing part of a Polarization maintaining fiber or a birefringent crystal.

Furthermore, the present invention can also be used as a replacement for highly dispersive glass prism pairs for ultra-short-pulse pulse compression.

Figure 6:
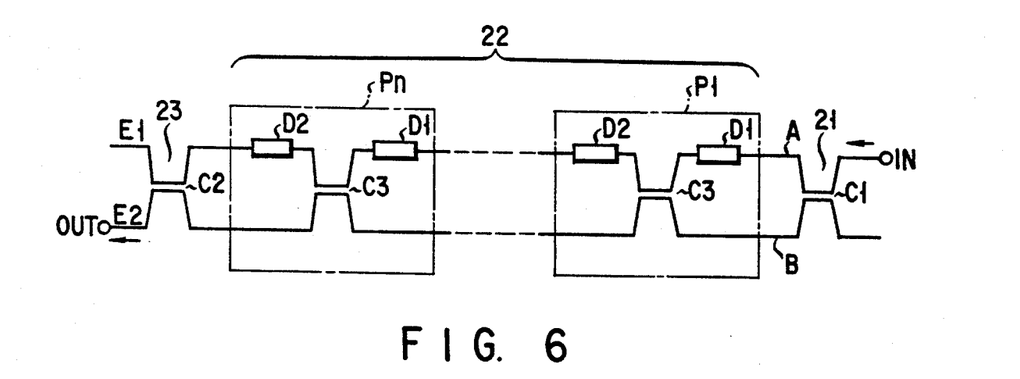
FIG. 6 illustrates a third embodiment of the optical equilizer of the present invention.

Although the first and second embodiments use birefringent sections, the use of light waveguides is also possible. FIG. 6 illustrates an optical equalizer using light waveguides according to a third embodiment of the present invention. Taking a normal dispersion fiber in which the delay time dispersion is minimum at 1.3 μm (frequency f1) as described above by way of example, assume here that the fiber is used for transmission of light waves in the 1.55-μm (frequency f2) band with smaller loss than that at 1.3 μm.

The optical equalizer shown in FIG. 6, which is realized by light waveguides, comprises an input section 21, an intermediate section 22, and an output section 23. Each of the sections 21 to 23 is equipped with a pair of systems A and B having no poralization dependence.

The input and output sections 21 and 23 are respectively provided with 3-dB directional couplers C1 and C2 for optically coupling the A, B systems. The coupler C1 in the input section 21 takes in a light wave from a light receiving end IN on the A-system side and then distributes the light wave to input ends of the A and B systems of the intermediate section 22. The coupler C2 in the output section 23 optically couples light waves emerging from the output ends of the A and B systems of the intermediate section 22 and delivers the optically coupled light waves to the light outputting end OUT on the B-system side.

The intermediate section 22 comprises two or more unit optical circuit elements P1 to Pn which are connected in series. Each of the optical circuit elements, which have the same arrangement, comprises first and second delay waveguides D1 and D2 which are installed in the A system, and a 3-dB directional coupler C3 which connects the waveguides D1 and D2 in series on the A system side and has its both ends on the B system side connected to the systems in the preceding and succeeding stages. The length of each of the delay waveguides D1 and D2 is increased or decreased by ½ or ¼ wavelength (¼ wavelength in this example) from a fixed length L according to a transmission bandwidth of interest.

The optical equalizer according to the third embodiment may be installed in any place in the normal dispersion fiber.

The operation of the optical equalizer according to the third embodiment will be described below.

First, the amplitudes (E1, E2) of light waves emerging from the output section 23 of the optical equalizer can be represented by a transfer matrix given by expression (14).

$$\begin{bmatrix} E_1 \\ E_2 \end{bmatrix} = \begin{bmatrix} \frac{1}{\sqrt{2}}, & \frac{1}{\sqrt{2}} \\ \frac{1}{\sqrt{2}}, & \frac{1}{\sqrt{2}} \end{bmatrix} \overset{(b)}{}$$

$$\left( \overset{(d)}{\begin{bmatrix} e^{-j\Phi}, & 0 \\ 0, & e^{j\Phi} \end{bmatrix}} \overset{(b)}{\begin{bmatrix} \frac{1}{\sqrt{2}}, & \frac{1}{\sqrt{2}} \\ \frac{1}{\sqrt{2}}, & \frac{1}{\sqrt{2}} \end{bmatrix}} \overset{(c)}{\begin{bmatrix} e^{-j\phi}, & 0 \\ 0, & e^{j\phi} \end{bmatrix}} \right)^n$$

$$\begin{bmatrix} \frac{1}{\sqrt{2}}, & \frac{1}{\sqrt{2}} \\ \frac{1}{\sqrt{2}}, & \frac{1}{\sqrt{2}} \end{bmatrix} \overset{(a)}{\begin{bmatrix} 1 \\ 0 \end{bmatrix}}$$

(b)

(14)

In this expression, (a) is a function indicating incoming light to the A system, (b) is a transfer function of the directional couplers C1, C2 and C3, (c) is a transfer function of the delay light waveguide D1 (a phase shift corresponding to $L \pm \lambda/4$ is supposed to be $2\phi$), and (d) is a transfer function of the delay waveguide D2 (a phase shift corresponding to $L \pm \lambda/4$ is supposed to be $2\phi$).

The calculation of expression (14) results in expression (15) where $U_n(\alpha)$ is the second-kind Chebyshev polynomial and $\alpha$ is expressed by expression (16).

$$\begin{bmatrix} E_1 \\ E_2 \end{bmatrix} = \begin{bmatrix} -\frac{j}{\sqrt{2}} \sin(\phi - \Phi)U_{n-1}(\alpha) - \frac{1}{\sqrt{2}} \cos(\phi - \Phi)U_{n-1}(\alpha) \\ \frac{j}{\sqrt{2}} \cos(\phi + \Phi)U_{n-1}(\alpha) - jU_{n-2}(\alpha) + \frac{1}{\sqrt{2}} \sin(\phi - \Phi)U_{n-1}(\alpha) \end{bmatrix} \quad (15)$$

$$\alpha = \frac{1}{\sqrt{2}} \cos(\phi + \Phi) \quad (16)$$

A group delay time Tg of the output E2 is given by expression (17) where f is an optical frequency, and $\phi$, $\Phi$ are represented by expression (18) when a delay time corresponding to length L is supposed to be T.

$$Tg = \frac{1}{2\pi} \frac{d}{df} [arg(E_2)] \quad (17)$$

$$\begin{cases} \phi = 2\pi fT \mp \frac{\pi}{4} \\ \Phi = 2\pi fT \pm \frac{\pi}{4} \end{cases} \quad (18)$$

More specifically, the delay time dispersion characteristic of the normal dispersion fiber is minimum at a wavelength of 1.3 μm (frequency f1) and linear in the 1.55-μm (frequency f2) band used. That is, the higher the frequency is than the used frequency f2, the smaller the delay dispersion amount becomes, while the lower the frequency is than f2, the larger the delay dispersion amount becomes. In order to broaden the transmission band, therefore, it is required only to provide great delay amounts for higher frequencies than the center frequency f2 and small delay amounts for lower frequencies so that delay amounts may be equalized over the transmission band used.

With the third embodiment, therefore, the directional coupler C1 in the input section 21 is used to distribute incoming light from the input end IN to the A and B systems. In each of the optical circuit elements P1 to Pn in the intermediate section 22, the directional coupler C3 couples light passing through the A system with light passing through the B system while the delay light waveguides D1 and D2 provide opposite delay times for each of frequency components. The outgoing light waves from the A and B systems in the intermediate section 22 are output, coupled by the directional coupler C2 in the output section 23, from the optical output OUT.

The repetition of the operation of a unit optical circuit by the multi-stage intermediate section 22 can be represented by the expression using the above-described Chebyshev polynomial. As is evident from this expression, small delay amounts are provided for low-frequency components, while large delay amounts are provided for high-frequency components. Thereby, the fiber's linear delay dispersion can be compensated for.

Figure 7A:
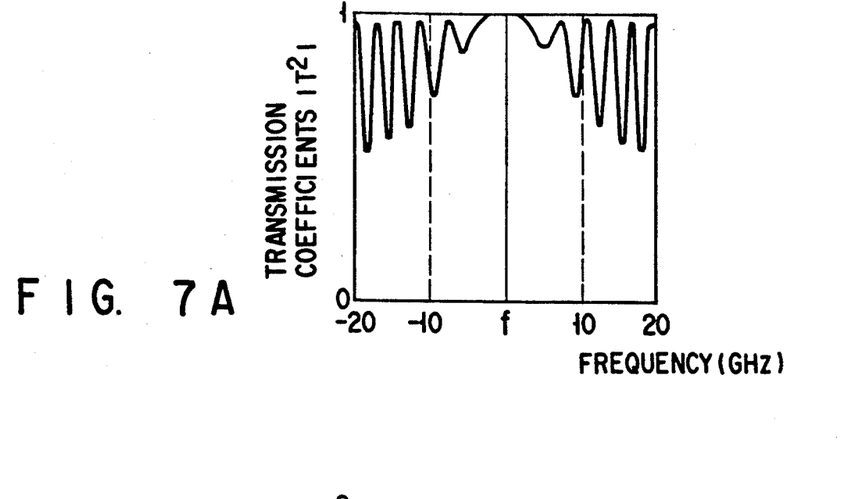
FIGS. 7A to 7C illustrate characteristics showing the expansion of transmission band achieved when the optical equalizer according to the third embodiment is used.
Figure 7B:
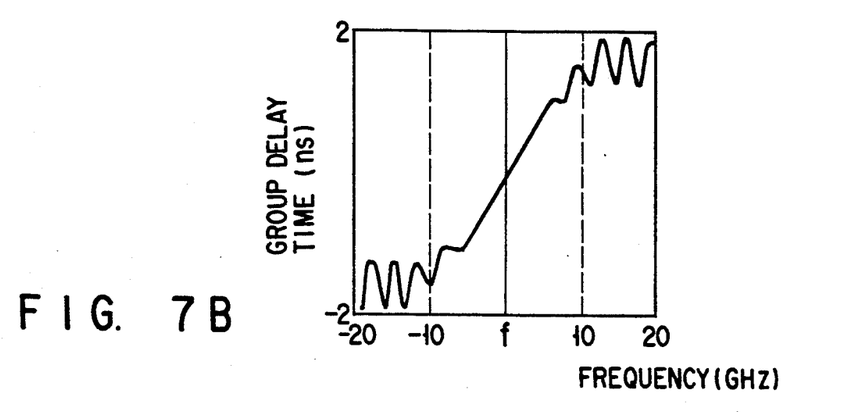
Figure 7C:
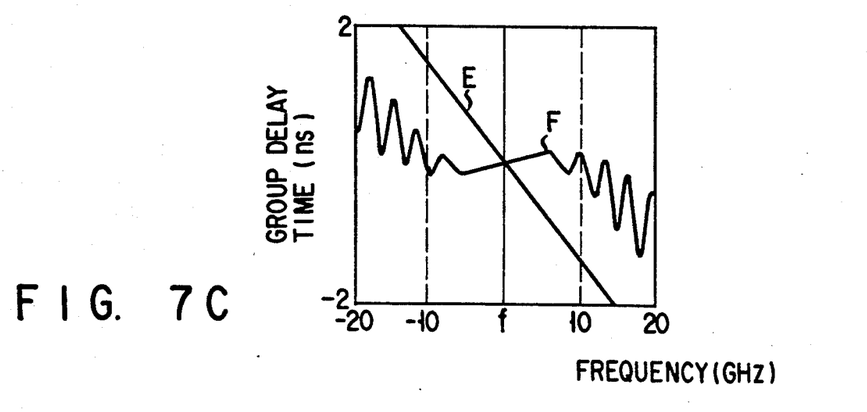

FIGS. 7A, 7B and 7C illustrate the compensation for the delay dispersion. This example supposes a case where an optical equalizer in which T1=T2=1/125 ns and n=12 is connected to a normal dispersive fiber in which the delay-time dispersion is minimum at 1.3 μm and which is 100 km in length. FIG. 7A shows the frequency-versus-transmission-coefficient characteristic of the normal dispersive fiber, FIG. 7B shows the frequency-versus-group-delay-time characteristic of the optical equalizer, and FIG. 7C shows the frequency-versus-group-delay-time characteristic of the normal dispersive fiber. In FIG. 7C, E represents the characteristic when the optical equalizer is not connected, while F represents the characteristic when the optical equalizer is connected. It is supposed that $\phi = 2\alpha fT - \alpha/4$ and $\Phi = 2\alpha fT + \alpha/4$.

As can be seen from FIG. 7C, when the optical equalizer is connected to the normal dispersive fiber used as an optical communication line, a transmission bandwidth of approximately ±10 GHz centered at f2 in the 1.55-μm band can be obtained. In this case, the passband has a Chebyshev-like amplitude response, which permits a sufficient bandwidth for multi-stage connection and compensation for linear delay dispersion.

Thus, as is the case with the first embodiment, the use of the above-described optical equalizer in much increasing the transmission speed of optical communication lines permits delay amounts for frequency components to be equalized and a transmission band involving a wavelength used to be expanded. Thus, existing optical communication lines comprising normal dispersive fibers can be used unchanged without using light amplifiers and light modulators, which can limit the transmission cost to a minimum.

In the case of the third embodiment, the optical equalizer is constructed, as a whole, from light waveguides having no polarization dependence. Thus, there is no need of taking polarization of light into account, increasing versatility over the first embodiment.

The necessity of compensation for the parabolic characteristic in the neighborhood of the zero dispersion point of a dispersion-shifted fiber having a minimum of dispersion at 1.55 μm in transmitting light waves in the 1.55-μm band over the fiber was described previously.

Figure 8:
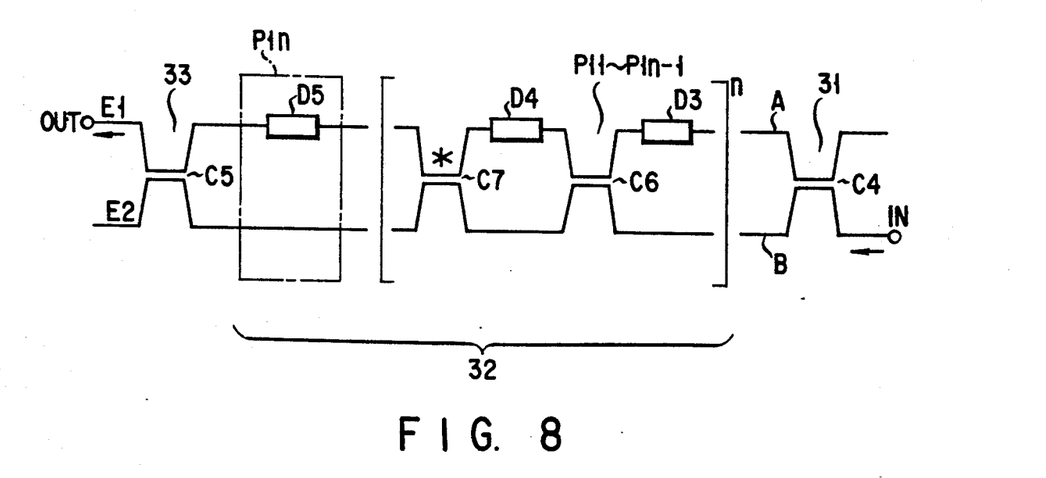
FIG. 8 illustrates a fourth embodiment of the optical equalizer of the present invention.

FIG. 8 illustrates an optical equalizer according to a fourth embodiment of the present invention which is constructed from light waveguides to realize that compensation.

The optical equalizer shown in FIG. 8, the whole of which is constructed from light waveguides, comprises an input section 31, an intermediate section 32, and an output section 33. Each section is equipped with a pair of systems A and B having no poralization dependence.

The input and output sections 31 and 33 are respectively provided with 3-dB directional couplers C4 and C5 for optically coupling the A and B systems. The directional coupler C4 in the input section 31 takes in light from the input end IN on the B-system side and then distributes it to the input ends of the A and B systems of the intermediate section 32. The directional coupler in the output section 33 optically couples light waves from the output ends of the A and B systems of the intermediate section 32 for transmission to the output end OUT on the A-system side.

The intermediate section 32 is constructed from two or more first unit optical circuit elements Pl1 to Pln-1 that are connected in series. The section 32 is further provided with a second optical circuit element Pln interposed between the output section 33 and the optical circuit element Pln-1.

Each of the first unit optical circuit elements Pl1 to Pln-1, having the same arrangement, is constructed from first and second delay light waveguides D3 and D4 each installed in the A system and first and second directional couplers C6 and C7 for coupling light waves transmitted over the A and B systems and distributing them to the A and B systems again.

The first delay light waveguide D3, which receives a light wave from the A system, has a fixed length corresponding to the wavelength of the light wave. The first directional coupler C6 optically couples an outgoing light wave from the first waveguide D3 and a light wave from the B system in the preceding stage for redistribution to the A and B systems.

The second waveguide D4, which receives the light wave distributed to the A system by the first directional coupler C6, has a length that is ¼ wavelength longer (or shorter) than the fixed length L. The second directional coupler C7 (indicated by * in the figure) has a coupling characteristic corresponding to three stages as compared with the first directional coupler C6 and optically couples an outgoing light wave from the second delay light waveguide D4 and a light wave distributed to the B system by the first directional coupler C6 for redistribution to the A and B systems in the succeeding stage.

The second unit optical circuit Pln has an A system in which a third delay light waveguide D5 is installed and a through B system. The third delay waveguide D5 has a fixed length L corresponding to the wavelength of light transmitted over the A system in the preceding stage.

The optical equalizer of the fourth embodiment may also be installed in any place in the normal dispersion fiber.

Hereinafter, the operation of the optical equalizer will be described. First, the amplitudes (E1, E2) of light waves emerging from the output section 33 of the optical equalizer can be represented by a transfer matrix given by expression (19).

$$\begin{bmatrix} E_1 \\ E_2 \end{bmatrix} = \begin{bmatrix} \frac{1}{\sqrt{2}}, & \frac{1}{\sqrt{2}} \\ \frac{1}{\sqrt{2}}, & \frac{1}{\sqrt{2}} \end{bmatrix}^{(b)} \begin{bmatrix} e^{-j\phi}, & 0 \\ 0, & e^{j\phi} \end{bmatrix}^{(c)} \tag{19}$$

$$\left( \begin{bmatrix} \frac{-1}{\sqrt{2}}, & \frac{j}{\sqrt{2}} \\ \frac{j}{\sqrt{2}}, & \frac{-1}{\sqrt{2}} \end{bmatrix}^{(f)} \begin{bmatrix} e^{-j\Phi}, & 0 \\ 0, & e^{j\Phi} \end{bmatrix}^{(c)} \right.$$

$$\left. \begin{bmatrix} \frac{1}{\sqrt{2}}, & \frac{j}{\sqrt{2}} \\ \frac{j}{\sqrt{2}}, & \frac{-1}{\sqrt{2}} \end{bmatrix}^{(e)} \begin{bmatrix} e^{-j\phi}, & 0 \\ 0, & e^{j\phi} \end{bmatrix}^{(c)} \right)^n$$

$$\begin{bmatrix} \frac{1}{\sqrt{2}}, & \frac{j}{\sqrt{2}} \\ \frac{j}{\sqrt{2}}, & \frac{-1}{\sqrt{2}} \end{bmatrix}^{(e)} \begin{bmatrix} 0 \\ 1 \end{bmatrix}^{(a)}$$

In this expression, (a) is a function indicating incoming light to the A system, (b) is a transfer function of the directional couplers C4 and C5 in the input and output sections 31 and 32, (c) is a transfer function of the delay light waveguides D3 and D5 (a phase shift corresponding to L is supposed to be $2\phi$), (d) is a transfer function of the delay waveguide D4 (a phase shift corresponding to L+λ/4 is supposed to be $2\phi$, (e) is a transfer function of the directional coupler C6, and (f) is a transfer function of the directional coupler C7. The calculation of expression (19) results in expression (20) where $U_n(\alpha)$ is the second-kind Chebyshev polynomial and $\alpha$ is expressed by expression (21).

$$\begin{bmatrix} E_1 \\ E_2 \end{bmatrix} = \tag{20}$$

$$(-1)^n \begin{bmatrix} j\cos\Phi\cos2\phi U_{n-1}(\alpha) - j\cos\phi U_{n-2}(\alpha) + \sin\Phi U_{n-1}(\alpha) \\ j\cos\Phi\sin2\phi U_{n-1}(\alpha) - j\sin\phi U_{n-2}(\alpha) \end{bmatrix}$$

-continued $$\alpha = \cos\Phi\cos\phi \quad (21)$$

A group delay time Tg for the output E2 is given by expression (22) where f is an optical frequency, and $\phi$, $\Phi$ are represented by expression (23) when a delay time corresponding to length L is supposed to be T.

$$Tg = -\frac{1}{2\pi}\frac{d}{df}[arg(E1)] \quad (22)$$

$$\begin{cases} \phi = 2\pi fT \\ \Phi = 2\pi fT \pm \frac{\pi}{2} \end{cases} \quad (23)$$

More specifically, in the fourth embodiment, the input section 31 distributes incoming light to the A and B systems. In each of the optical circuit elements Pll to Plnl and Pn in the intermediate section 33, the directional couplers C6 and C7 couple light passing through the A system with light passing through the B system while the delay light waveguides D3, D4 and D5 provide opposite delay times for each of frequency components. The repetition of the operation by the multi-stage intermediate section can be represented by the expression using the above-described Chebyshev polynomial. That is, frequency-dependent delay times are provided, whereby the fiber's parabolic characteristic in the neighborhood of the zero dispersion point can be compensated for.

Figure 9A:
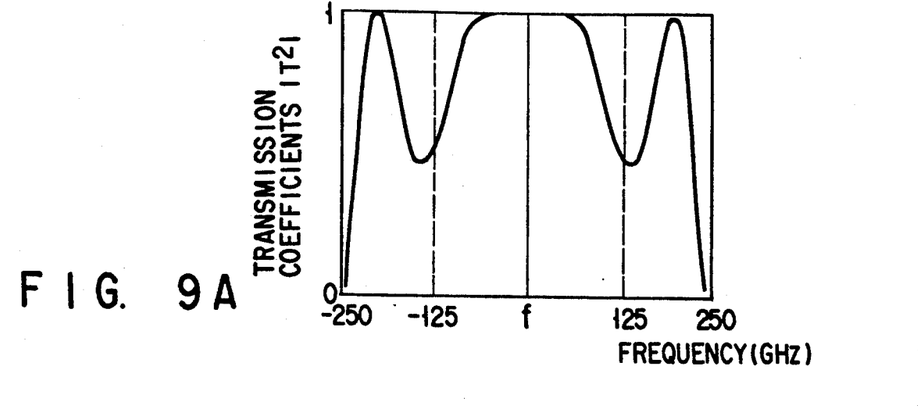
FIGS. 9A to 9C illustrate characteristics showing the expansion of transmission band achieved when the optical equalizer according to the fourth embodiment is used.
Figure 9B:
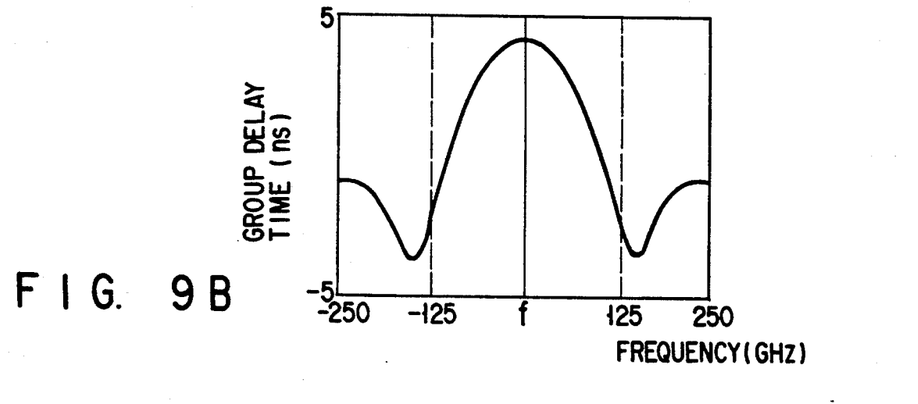
Figure 9C:
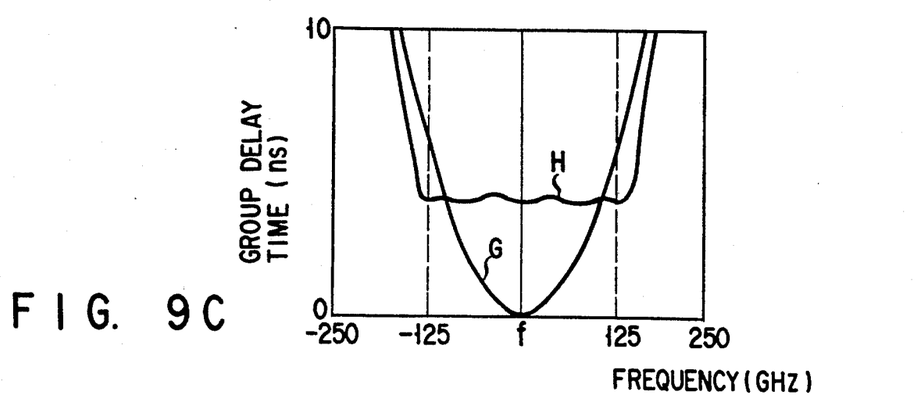

FIGS. 9A, 9B and 9C illustrate that compensation. As in the second embodiment, this example supposes a case where an optical equalizer in which T1=T2=10 ps and n=8 is connected to a dispersion-shifted fiber in which the delay-time dispersion is minimum at 1.55 μm and which is 100 km in length. FIG. 9A shows the frequency-versus-transmission-coefficient characteristic of the dispersion-shifted fiber, FIG. 9B shows the frequency-versus-group-delay-time characteristic of the optical equalizer configured as described above, and FIG. 9C shows the frequency-versus-group-delay-time characteristic of the dispersion-shifted fiber. In FIG. 9C, G represents the characteristic when the optical equalizer is not connected, while H represents the characteristic when the optical equalizer is connected. It is supposed that $\phi = 2\alpha fT - \alpha/4$ and $\Phi = 2\alpha fT + \alpha/4$.

From FIGS. 9A, 9B and 9C it will be understood that a transmission bandwidth of approximately ±125 GHz centered at f (1.55 μm) is obtained. This is due to the connection of the optical equalizer having a characteristic that is the opposite of the fiber's parabolic characteristic in the neighborhood of the zero dispersion point of the dispersion-shifted optical fiber.

The optical equalizer using the light waveguides also permits compensation for the parabolic characteristic in the neighborhood of the zero dispersion point of the dispersion-shifted optical fiber. As in the case of the third embodiment, the optical equalizer is constructed, as a whole, from optical waveguides having no polarization dependence. Thus, there is no need of taking polarization of light into account, increasing versatility.

Thus, the use of the above-described optical equalizer permits the bandwidth deficiency problem to be solved without requiring complicated control. For this reason, even in a case where the optical equalizer is used with such a very-high-speed long-distance transmission line as extends over the Pacific Ocean, in which case information is relayed by optical amplifiers without being converted to electric signals, the deficiency of bandwidth can be solved without requiring complicated control. This can limit the transmission cost to a minimum.

Although the preferred embodiments of the present invention have been disclosed and described, it is apparent that other embodiments and modifications ar possible.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical equalizer for use with an optical fiber serving as an optical communication line comprising:
   a light separating section for extracting a poralized component in one direction from an incident light wave and separating the polarized component into a pair of complex light waves;
   an optical circuit section, including a plurality of birefringent sections that are connected in series with an angle made between their principal axis in a place where they are connected and a phase plate installed in a place where they are connected, for providing a different amount of delay for each of said complex light waves in transmitting said pair of complex light waves output from said light separating section to thereby equalize dispersion in delay time; and
   a light combining section for combining said pair of complex light waves whose dispersion in delay time has been equalized by said optical circuit section, the combined complex light waves being delivered to an optical fiber.

2. The optical equalizer according to claim 1, in which, in a case where a wavelength band used for transmission of light waves is set in linear region of a group delay time dispersion characteristic of said optical fiber, said optical circuit section comprises two or more unit optical circuit elements connected in series, each of said optical circuit elements having first and second birefringent sections having a ratio of one to one in length, the light receiving surface of said second birefringent section being connected with the optical output surface of said first birefringent section so that a principal axis of said second birefringent section makes an angle of +45 degrees with a principal axis of said first birefringent section, said first birefringent section in the first-stage unit optical circuit element having its light receiving surface connected with the optical output surface of said light separating section so that its principal axis have a relation of 45 degrees to the plane of poralization of said light separating section, and said first birefringent section in a succeeding stage having its light receiving surface connected with the optical output surface of said second birefringent section in a preceding-stage unit optical circuit element so that its principal axis is aligned with a principal axis of said birefringent section in the preceding-stage unit optical circuit element, and in which said light combining section has its light receiving surface connected with the optical output surface of said second birefringent section of said unit optical circuit element in the last stage so that its plane of polarization has a relation of 45 degrees to a principal axis of said second birefringent section in said last-stage unit optical circuit element.

3. The optical equalizer according to claim 2, in which a ¼ wavelength phase plate is interposed between said first and second birefringent sections in each of said unit optical circuit elements.

4. The optical equalizer according to claim 1, in which, in a case where a wavelength band used for transmission of light waves is set in the neighborhood of the point of zero dispersion in a group delay time dispersion characteristic of said optical fiber, said optical circuit section comprises two or more first unit optical circuit elements connected in series and a second unit optical circuit element connected in series with the last stage of said first unit optical circuit elements, each of said first optical circuit elements having first and second birefringent sections having a ratio of one to one in length, the light receiving surface of said second birefringent section being connected with the optical output surface of said first birefringent section so that a principal axis of said second birefringent section makes an angle of +45 degrees with a principal axis of said first birefringent section, said first birefringent section in the first-stage unit optical circuit element having its light receiving surface connected with the optical output surface of said light separating section so that its principal axis have a relation of 45 degrees to the plane of poralization of said light separating section, said first birefringent section in a succeeding stage having its light receiving surface connected with the optical output surface of said second birefringent section in a preceding-stage unit optical circuit element so that its principal axis makes an angle of −45 degrees with a principal axis of said birefringent section in the preceding-stage unit optical circuit element, and said second unit optical circuit element consisting of a birefringent section that is the same as said first birefringent section, and in which said light combining section has its light receiving surface connected with the optical output surface of said birefringent section of said second unit optical circuit element so that its plane of polarization has a relation of 45 degrees to a principal axis of said birefringent section in said second optical circuit element.

5. The optical equalizer according to claim 4, in which a ½-wavelength phase plate is interposed between said first and second unit optical circuit elements.

6. An optical equalizer for use with an optical fiber serving as an optical communication line comprising:
an input section having light distributing means for distributing an incoming light wave to first and second systems by light waveguides with no polarization dependence;
an intermediate section for repeating a delay process of delaying a light wave distributed to said first system by said input section and optically coupling and distributing process of optically coupling the delayed light wave on said first system and a light wave on said second system and then distributing the optically coupled light wave to said first and second systems; and
an output section having optically coupling means for optically coupling light waves finally distributed to said first and second systems in said intermediate for transmission to said optical fiber.

7. The optical equalizer according to claim 6, in which, in a case where a wavelength band used for transmission of light waves is set in a linear region of the group delay time dispersion characteristic of said optical fiber, said intermediate section comprises two or more unit optical circuits connected in series and formed of light waveguides with no polarization dependence, each of said unit optical circuits including a first light delaying means for delaying light distributed to said first system by said input section or a preceding-stage unit optical circuit, optically coupling/distributing means for optically coupling the light delayed by said first light delaying means and light distributed to said second system and then distributing the optically coupled light to said first and second systems, and second light delaying means for delaying light distributed to said first system by said optically coupling/distributing means.

8. The optical equalizer according to claim 7, in which said light distributing means in said input section comprises a directional coupler, said first and second light delaying means in each of said unit optical circuits in said intermediate section each comprises a light delaying waveguide, said optically coupling/ distributing means in said intermediate section comprises a directional coupler, and said optically coupling means in said output section comprises a directional coupler.

9. The optical equalizer according to claim 8, in which said light delaying waveguide used in said first light delaying means has a length that is ¼ wavelength longer than a constant length L corresponding to the wavelength of a transmit light wave, and said light delaying waveguide in said second light delaying means has a length that is ¼ wavelength shorter than the constant length L corresponding to the wavelength of the transmit light wave.

10. The optical equalizer according to claim 6, in which, in a case where a wavelength band used for transmission of light waves is set in the neighborhood of the point of zero dispersion in the group delay time dispersion characteristic of said optical fiber, said intermediate section comprises two or more first unit optical circuits and a second unit optical circuit which are connected in series, each of said unit optical circuits being formed of light waveguides with no polarization dependence, each of said first unit optical circuits including a first light delaying means for delaying light distributed to said first system by said input section or a preceding-stage first unit optical circuit, first optically coupling/distributing means for optically coupling the light delayed by said first light delaying means and light distributed to said second system and then distributing the optically coupled light to said first and second systems, second light delaying means for delaying light distributed to said first system by said first optically coupling/distributing means, and second optically coupling/distributing means for optically coupling light delayed by said second light delaying means and light distributed to said second system by said first optically coupling/ distributing means and then distributing the optically coupled light to said first and second systems, and said second unit optical circuit includes a third light delaying means for delaying light distributed to said first system by the last-stage first unit optical circuit, said second unit optical circuit outputting light on said second system a it is.

11. The optical equalizer according to claim 10, in which said light distributing means in said input section comprises a directional coupler, said first and second light delaying means in each of said first unit optical circuits in said intermediate section each comprise a light delaying waveguide, said first and second optically coupling/distributing means in said intermediate section each comprise a directional coupler, and said optically coupling means in said output section comprises a directional coupler.

12. The optical equalizer according to claim 11, in which said light delaying waveguide used in said first light delaying means has a constant length corresponding to the wavelength of a transmit light wave, said light delaying waveguide in said second light delaying means has a length that is ½ wavelength longer or shorter than the constant length L, and said light delaying waveguide used in said light delaying means has the constant length.

13. The optical equalizer according to claim 10, in which said said second optical coupling/distributing means in said first unit optical circuit is larger in degree of coupling that said second optical coupling/distributing means.

* * * * *